United States Patent [19]

Mitchell et al.

[11] Patent Number: 4,514,427
[45] Date of Patent: Apr. 30, 1985

[54] REMOVAL OF BITTER NARINGIN AND LIMONIN FROM CITRUS JUICES CONTAINING THE SAME

[75] Inventors: Donald H. Mitchell; Richard M. Pearce, both of Winter Haven; C. Byron Smith, Lake County; Sand T. Brown, Lakeland, all of Fla.

[73] Assignee: Mitco Water Laboratories Inc., Winter Haven, Fla.

[21] Appl. No.: 496,340

[22] Filed: May 19, 1983

[51] Int. Cl.³ .......................... C12H 1/04; A23L 2/00
[52] U.S. Cl. ................................ 426/271; 426/330.5; 426/422
[58] Field of Search .................... 426/271, 330.5, 422, 426/333, 590

[56] References Cited

U.S. PATENT DOCUMENTS 4,439,458  3/1984  Puri .................................. 426/330.5

FOREIGN PATENT DOCUMENTS 58-56663  4/1983  Japan ................................. 426/271

Primary Examiner—George Yeung
Attorney, Agent, or Firm—Mason, Fenwick & Lawrence

[57] ABSTRACT

The principle bitter flavor components of natural grapefruit juice, naringin and limonin are substantially reduced by treatment of the grapefruit juice with a weak base anion exchange resin having a styrene polymer matrix carrying functional groups derived from a mono or poly amine. The ion exchange treatment also reduces the acid content of the grapefruit juice and does not impair the nutrient content or the desirable flavors in the treated juice.

3 Claims, No Drawings

REMOVAL OF BITTER NARINGIN AND LIMONIN FROM CITRUS JUICES CONTAINING THE SAME

FIELD OF THE INVENTION

This invention relates to the treatment of grapefruit juice and is concerned more specially with an improved process for contacting natural grapefruit juice with an ion exchange medium effective to reduce the bitterness of the grapefruit juice as well as its acidity.

BACKGROUND OF THE INVENTION

It is known in the art that fruit juices such as citrus juices can by means of an ion exchange treatment be made to undergo a change in the perceptive acidity of such juices. Taste tests have established that the natural acidity of such juices is objectionably strong to a significant number of prospective purchasers who would prefer a less tart or sharp flavor. A process to achieve this result was first disclosed by Kilburn et al. in U.S. Pat. No. 3,165,415, filed Oct. 4, 1960 and issued Jan. 12, 1965, wherein the juice to be treated was passed through a multi-compartment electrodialysis system in alteration compartmentwise with a liquid electrolyte, the compartments being separated by an anion selective membrane permeable to passage therethrough of ions extracted from the juice and the electrolyte to thereby substitute one for the other and consequently alter the pH of the juice being treated. The process was described as equally useful for inducing an increase in the pH of a pH deficient juice, such as tomato juice, as to decrease the pH of an excessively acidic juice, such as orange or grapefruit juice, the ion permeable membrane being in the one case a film of a cation exchange resin and in the other case a film of an anionic exchange resin. The basis of this discovery was that, although the pH of natural fruit juices changes during their natural production season, the concentration of salts of weak acids which such juices contain remains substantially constant throughout such season. Hence, although the theoretical pH of any buffered solution, i.e., containing a free acid and its salts, depends upon the relative concentrations of both of the free acid and the salt, if the salt concentration remains constant, it follows that overall pH variation must in the case of citric acids be due to the free acid content of such juices. This creates the possibility for extracting proportions of the free acid content of citric and like juices by means of anion exchange or alternatively to convert citric salts to free acid by a cation exchange resin to increase the acidity for other low acid juices.

Kilburn et al. acknowledge the presence of bitterness in grapefruit juices and to some extent in some other fruit juices but give no indication of any effect on bitterness of their ion exchange treatment. Their theoretical discussion is focused on the adjustment of the levels of citric acid and citrate salts in the treated juice and the vitamin and mineral content and flavor generally are said to be unimpaired. The dialyzing membrane is designed to be selectively permeable only to either anions or cations dependent upon whether the pH of the juice was to be lowered or raised and would be impermeable to other molecules, particularly of organic flavor components.

About a decade later, research on the production of a reduced acid orange juice was spearheaded by the Coca Cola Company, Foods Division, and in the Fall of 1979, a paper was presented on behalf of that group by Dr. K. Assar, entitled "Reduced Acid FCOJ" to the Florida citrus industry, which paper was subsequently published in the "Proceedings of the 19th Annual Short Course for the Food Industry at the Institute of Food and Agricultural Sciences of the University of Florida, Gainesville, Fla." during 1980. This paper describes the efforts of this group to produce and market a reduced acid frozen concentrated orange juice obtained by an ion exchange treatment and having the approval of both Florida and federal authorities which efforts were eventually successful and led to the promulgation by both the Florida state authorities and the FDA of an approved definition for such a juice, the federal regulation appearing in CFR, Title 21—Foods and Drugs—§§146.150 and 173.25. The research summarized here focused on the acceptability of the reduced acid product from various health aspects, confirming the initial conclusion of Kilburn et al. that the ion exchange treatment had no significant consequences on the vitamin content of the treated juice and extending that conclusion to other nutrient components, such as ascorbic and folic acids, minerals and amino acids. The treatment in general involved passing the juice downwardly through a bed of a weak base anion exchange resin not otherwise identified.

The Assar paper refers to the practice of the Florida citrus industry of packing grapefruit juice with added sugar to render the juice more palatable but contains no mention of the bitterness of grapefruit juice as such. The concern of the program it summarizes was to develop a marketable reduced acid orange juice, and grapefruit juice apparently was never studied. Orange juice does not contain either of the principal bitter flavor components of grapefruit juice, naringin and limonin in any significant amount, if at all.

According to U.S. Pat. No. 3,801,717 to Huffman, issued Apr. 2, 1974, the development of off-flavors in citrus juices or other liquid foods during pasteurization by heating can be substantially diminished by treating the liquid in question before heating to contact with an ion exchange material, either anionic or cationic and preferably strongly cationic.

DISCOVERY OF THE INVENTION

It has now been discovered that naringin and/or limonin, the bitter flavor components in citrus juices, especially grapefruit juice and lemon juice, can be at least substantially removed from juices containing the same by treatment with a particular type of weak base anionic exchange resin having a styrene type matrix and functional groups derived from mono and poly amines.

DETAILED DESCRIPTION OF THE INVENTION

It is known that the fruit and rind of grapefruit contain a small but significant amount of the complex glucocide naringin which is more precisely identified as 4'5,7-trihydroxyflavanone 7-rhamnoglucoside having the general formula $C_{27}H_{32}O_{14}$ and a molecular weight of about 580.53. The extraction of this flavor component from grapefruit peel is disclosed in, for instance, U.S. Pat. Nos. 2,421,062 and 2,421,063. In the course of extracting grapefruit juice from the fruit itself, this bitter flavor component finds its way into the juice and is an important source of the common characterized bitterness of grapefruit juice.

Similarly, it is known that a bitter flavor component limonin having a complex molecular structure with the general formula of $C_{26}H_{35}O_8$ and a molecular weight of 470.5 is found in grapefruit, lemons and the like and likewise appears in the juices extracted from such fruit contributing to the bitterness thereof.

We have discovered that the bitter flavor principles naringin and/or limonin can be at least substantially removed from citrus juice containing the same by subjecting such juices to contact with an ion exchange resin of the type having a styrene matrix carrying functional groups derived from mono and/or polyamines. Such resins are typically constituted of a styrene polymer or styrene-divinylbenzene copolymer, as a matrix, which is initially subjected to chloromethylation, followed by amination with a mono or polyamine such as trimethylamine, dimethylamine, diethylenetriamine or dimethylethanol amine to introduce functional groups into said matrix. Resins of this type are readily available in commerce either in gel or macroporous structure form, of which the latter is preferred. A specific resin of this type which has been found highly suitable for the treatment of the invention has a cross-linked copolymeric styrene-divinylbenzene matrix which after chloromethylation is animated with dimethylamine, and is sold under the trade name DOWEX 66 by the Dow Chemical Company of Midland, Mich. A similar resin is sold under the designation AFP 329 by Cybron Corporation, Chemical Division of Birmingham, N.J.

A general structure formula for ion exchange resins of this type appears below in which the symbol R represents the functional group derived from the mono or polyamine, of which illustrative examples are identified above.

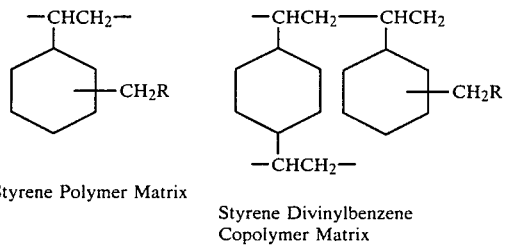

Styrene Polymer Matrix

Styrene Divinylbenzene Copolymer Matrix

The effectiveness of this weakly basic anionic exchange resin of the type just defined in extracting the naringin and/or limonin from the juice is unexpected and cannot be explained. The property appears to be peculiar to resins of that type and known weak base anionic exchange resins of other types have been found to lack this capacity to any substantial extent. Normally, ion exchange resins, as their name implies, function by participating in an exchange of either anions or cations, depending upon their nature, with a liquid medium being processed, in which one kind of ions available in the liquid and desired to be removed upon contact with the resin replaces a different kind of ion initially carried on the resin which is more innocuous than the extracted ion and in turn replaces the latter within the solution. Within this general mechanism, weak base anionic exchange resins are generally recognized as having a high affinity for strong or highly ionized acids which have no similarity or analogy whatsoever to the complex flavor principles naringin and limonin. It is presumed that in the inventive treatment, these complex flavor principles are adsorbed in their entirety on the resin but it is not presently understood why such adsorption should occur or why the class of resins in question should exhibit a peculiar affinity for the same.

The mechanical details of the manner of bringing the juice to be treated into effective contact with the selected exchange resin have no important connection with the concept of the invention and, as a general rule, any mode of treatment used for other purposes in the ion exchange art would be effective here. For example, a quantity of the selected resin in finely divided form, as is the usual form of commerce, say having a particle size in the range of about 20-40 mesh with an average of around 30 mesh can be mixed with a batch of the juice to be treated and agitated for a given period of contact, after which the resin and juice are separated either by decantation, filtration or any other separation technique. Alternatively, the juice can be percolated downwardly through a supported bed of resin particles in the manner well known in the art and as referred to in the Assar paper above. A preferred mode of contact is described and claimed in a concurrently filed patent application entitled "Upflow Ion Exchange Treatment of Natural Edible Juices Containing High Acidity and Suspended Solids" by Mitchell et al. As described in the latter application, the juice to be treated is passed upwardly through a laterally confined bed of the resin particles at a velocity sufficient to cause a significant expansion of the volume of the bed particles, a result that has been found advantageous in permitting the processing of juices containing a significant content of suspended solids, such as pulp.

The time of contact between the treatment liquid and the body of resin particles will be determined in accordance with the accepted practice in this art. For resins of the type defined above, a maximum throughput velocity for an efficient exchange reaction is of about 2 gpm/ft$^3$ resin. Thus, for a bed type exchange operation in either direction, as long as the liquid velocity does not exceed this maximum value, one can be reasonably assured of an efficient degree of contact and thus efficient removal of the bitter principles from the juice being treated. For batch-type treatment agitation of a mixture of resin and juice for a few minutes will ordinarily suffice. Obviously, the just specified maximum is not absolute and where high production output is of paramount importance, somewhat higher velocities could be employed subject to a commensurate decrease in the efficiency of the treatment and thus of the removal of the bitter principles from the juice.

After a given body of resin has lost its effectiveness for further use, it can and ordinarily will be treated to regenerate its ion exchange capacity in the manner conventional in the art, and the details of the regeneration treatment as well as the associated rinsing and backwashing steps and the like play no role in the invention and need not be described in detail.

As the following examples establish, the process of the invention has been carried out successfully on grapefruit juice, and either fresh or single strength grapefruit or reconstituted grapefruit juice, i.e., a juice that has been previously concentrated by evaporation or similar concentration techniques and then reconstituted by mixing with water to its original dilution can serve equally as starting juice. It will be apparent that the process could also be applied to the removal of limonin from lemon juice and to the removal of either of these bitter principles from other fruit juices wherein they may be present. The treatment of the invention is also effective to significantly reduce the acidity of the juice being treated, similar to that achieved by Kilburn et al. and described in the Assar paper in connection with orange juice, such acid reduction occurring without serious impairment in the sweetness of the juice and consequently resulting in greatly increased Brix/acid ratios for the treated juices.

The execution in practice of the process of the invention will be further explained by the following non-limiting working examples.

EXAMPLES

EXAMPLE 1

To illustrate the operation of the process of the invention with a multi-stage exchange column, a laboratory scale multi-stage column was obtained formed of a vertical stack of eight individual stages, each stage being one foot in vertical height and an internal diameter of four inches, each stage having at its ends a peripheral flange for attachment with bolts to the next stage with intervening gasketing for sealing purposes, a perforated mesh or screen of about 30 mesh being held at each such joint to support the resin. A total of approximately 1 ft$^3$ of DOWEX 66 was employed, distributed evenly throughout the five lower stages of this column, the upper three stages being left empty. The column was equipped with central liquid inlet and outlet ports at its upper and lower ends. This multi-stage column was employed for the treatment of reconstituted grapefruit juice delivered at a rate of 1 gpm/ft$^3$ resin. The bed height for each of these stages was approximately eight inches. The starting juice was analyzed for its characteristic values as were samples taken during the course of the experiment, and these values together with a set of average values for the treated product are summarized in Table 1 below.

TABLE 1

|  | Time | Brix | Acid % | Ratio |
|---|---|---|---|---|
| Pretreatment influent |  | 10:35 | 1.25 | 8.28 |
|  | 11:00 | 6.0 | 0 | ∞ |
|  | 11:25 | 7.8 | 0 | ∞ |
|  | 11:40 | 8.4 | 0 | ∞ |
|  | Noon | 7.9 | 0 | ∞ |
|  | 12:25 | 8.6 | 0 | ∞ |
|  | 12:45 | 8.6 | 0 | ∞ |
|  | 1:35 | 8.6 | 0 | ∞ |
|  | 2:30 | 8.9 | 0.02 | 445 |
|  | 2:50 | 9.6 | 0.01 | 860 |
|  | 3:10 | 8.7 | 0.03 | 291 |
|  | 3:30 | 9.1 | 0.03 | 304 |

A sample of the treated juice was analyzed for naringin and limonin using the accepted analytical techniques for detecting these flavor components, and from this analysis it was analysis it was determined that 98% of the original naringin and 100% of the original limonin had been removed by the treatment of the example.

EXAMPLE 2

In example 2 fresh or single strength grapefruit juice was processed on a pilot scale treatment column having a height of about 6 ft 4 in, an interior diameter of about 2 ft with inlet and outlet distribution pipes disposed at its lower and upper ends, respectively. This column was loaded with 10 ft$^3$ of a weak base anionic exchange resin obtained from the Dow Chemical Company of Midland, Mich., under the trade name DOWEX WGR-2 to give a bed height within the column of about 3 ft. The grapefruit juice was fed through the column at a flow ratio within the range of 8–12 actual gal/min which was equivalent to about 0.08–1.2 gpm/ft$^3$ resin and equivalent to a throughput velocity of 2.5–4 gpm/ft$^2$ of bed area. The initial pulp content of the grapefruit juice was 6% and this content remained substantially constant during the treatment. The initial oil content was 0.007% by volume, and the final oil content was 0.006% by volume. The processing was continued for several hours and at intervals during this time samples of the treated juice were taken and analyzed as to various relevant properties, and these values are summarized in the following Table 2A together with the comparable values for the starting juice and the final combined treated juice.

TABLE 2A

| Time | Brix | Acid % | pH | Ratio |
|---|---|---|---|---|
| 9:15 | 8.40 | .77 | 3.3 | 11.55 |
| 9:30 | 5.10 | .09 | 4.8 | 60.44 |
| 9:45 | 6.00 | .09 | 4.9 | 70.66 |
| 10:00 | 6.80 | .09 | 4.9 | 79.55 |
| 10:15 | 7.30 | .15 | 4.6 | 51.33 |
| 10:30 | 7.50 | .20 | 4.4 | 39.50 |
| 10:45 | 7.80 | .22 | 4.3 | 37.27 |
| 11:00 | 7.80 | .27 | 4.1 | 30.37 |
| 11:15 | 7.80 | .32 | 4.0 | 25.63 |
| 11:45 | 8.10 | .41 | 3.8 | 20.59 |
| 12:15 | 8.00 | .45 | 3.7 | 18.89 |
| 12:50 | 8.00 | .50 | 3.5 | 17.08 |
| 1:33 | 8.20 | .55 | 3.4 | 15.91 |
| Composite | 7.80 | .39 | 3.7 | 20.92 |

During the above experiment, several additional samples were taken at selected times and were subjected separately to a different analysis for Brix and acid values as well as naringin and limonin content. The limonin values were obtained with a relatively new enzymeimmuno assay, while the naringin was measured both by a HPLC test procedure as well as by the traditional Davis test. The results of these tests are summarized below in Table 2B. It appears from these results that the resin DOWEX WGR-2 had little or no effectiveness in removing the naringin and limonin from the grapefruit juice being treated. This resin is a weak base anionic exchange resin having an epoxy amine matrix obtained by condensing epychlorohydrin with ammonia and then subjected to quaternization with methyl chloride to produce about 10% quaternary ammonium functional groups with the remainder of such groups being tertiary amines.

TABLE 2B

| Sample | °Brix | Acid | Brix/Acid | Limonin (ppm) | Naringin (ppm) HPLC | Naringin (ppm) Davis |
|---|---|---|---|---|---|---|
| Initial (9:30) | 8.7 | .75 | 11.6 | 4.1 | 511 | 912 |
| 9:55 | 7.3 | .15 | 48.7 | 2.7 | 443 | 780 |
| 10:25 | 7.6 | .22 | 34.5 | 3.2 | 551 | 912 |
| 10:55 | 8.0 | .30 | 26.7 | 3.2 | 564 | 858 |
| 11:25 | 8.1 | .38 | 21.3 | 2.9 | 548 | 898 |

What is claimed is:

1. A method of concurrently reducing acidity and the naringin and/or limonin content of citrus juices containing the same which comprises contacting such juice with a mass of particles of a weak base anionic exchange resin having a matrix of a styrene polymer and functional groups derived from a mono or polyamine, the duration of such contact being sufficient to substantially reduce simultaneously said naringin and/or limonin content and the acidity of said juice.

2. The method of claim 1 wherein said juice is contacted with said resin by passing the same through a confined bed of resin particles at a rate not substantially greater than 2 gpm/ft$^3$ of resin.

3. The method of claim 1 wherein said resin has a matrix which is a copolymer of styrene and divinylbenzene and said functional groups are derived from dimethylamine.

* * * * *